(No Model.)
A. E. SCHMIDT.
SAFETY SHUTTER AND SCREEN FOR SHOP WINDOWS, &c.
No. 579,282. Patented Mar. 23, 1897.
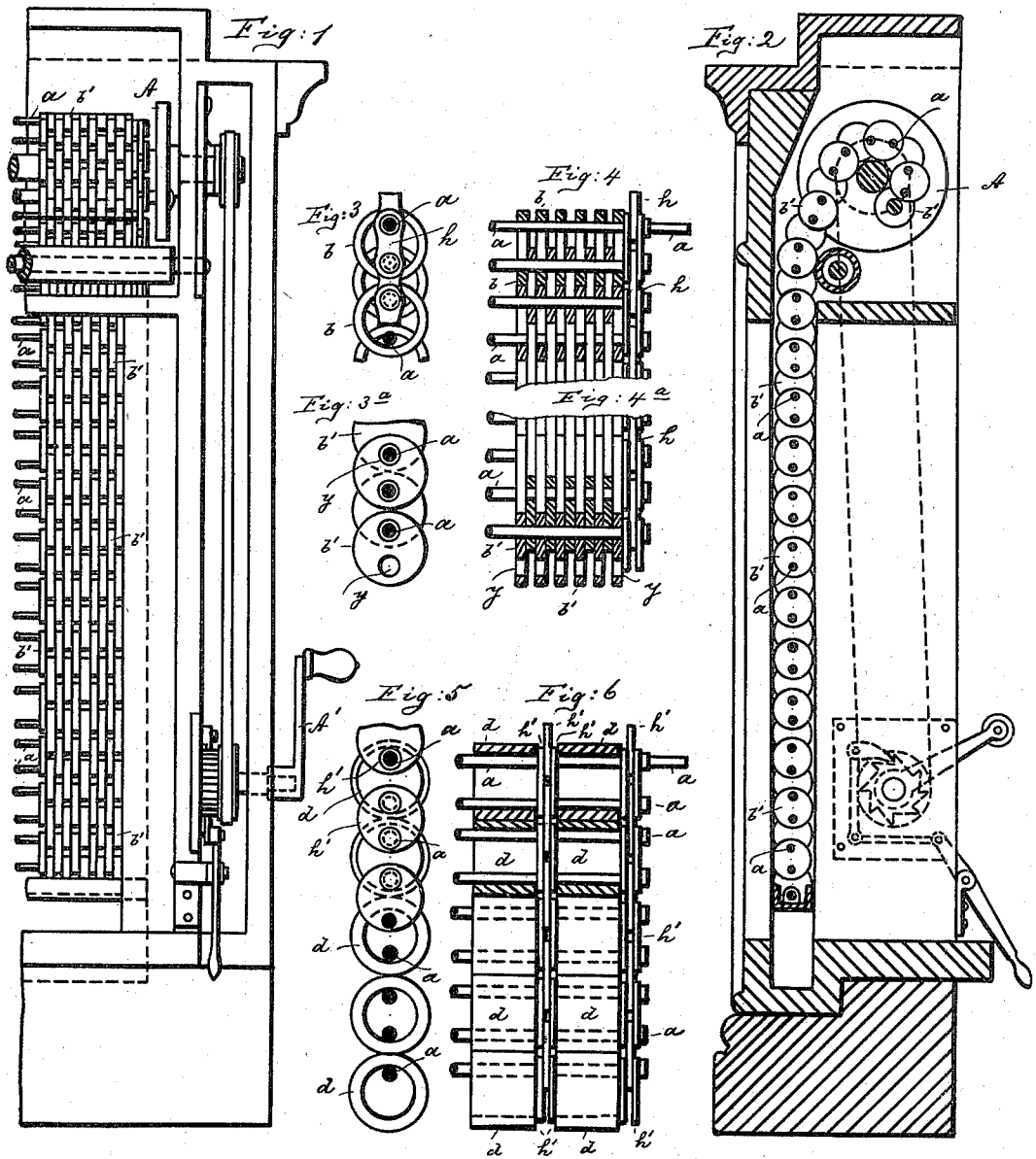

UNITED STATES PATENT OFFICE.

AUGUST EDMUND SCHMIDT, OF LEIPSIC, GERMANY.

SAFETY SHUTTER AND SCREEN FOR SHOP-WINDOWS, &c.

SPECIFICATION forming part of Letters Patent No. 579,282, dated March 23, 1897.

Application filed August 15, 1896. Serial No. 602,833. (No model.)

*To all whom it may concern:*

Be it known that I, AUGUST EDMUND SCHMIDT, a subject of the King of Saxony, residing at Leipsic, Saxony, Germany, have invented a new and useful Improvement in Safety Shutters and Screens for Shop-Windows and the Like and for Theater-Curtains, of which the following is a specification.

This invention relates to an improved construction of safety-shutters more particularly adapted to be used for window-blinds and show-windows, though it may also be used for fireproof theater-curtains and other purposes.

The shutter is composed of a number of pivoted disks or rings which are connected in such a manner that each part is revoluble, but forms in conjunction with the other parts a burglar-proof body which may be readily raised and lowered.

In the accompanying drawings, Figure 1 is a rear view of my improved shutter as applied to a show-window. Fig. 2 is a longitudinal section thereof; Fig. 3, an end view of one form of the link; Fig. 3ª, a similar view of another form of link; Fig. 4, a longitudinal section of Fig. 3; Fig. 4ª, a similar section of Fig. 3ª; Fig. 5, an end view of a third form of link, and Fig. 6 a longitudinal section of Fig. 5.

The shutter is composed of a number of parallel rods $a$, that carry the rings or disks in such a manner that the latter are arranged in horizontal rows, the rings or disks of any one row being placed between—i. e., out of vertical alinement with—the rings or disks of the adjoining rows. This result is effected by passing each rod $a$ (excepting the top and bottom rods) alternately through the lower ends of the rings or disks forming the upper row and the upper ends of the rings or disks forming the lower row. In this way it will be seen that each ring or disk is engaged by two adjoining rods $a$, so as to be securely held in place while at the same time free to slightly rotate when the shutter is raised and lowered.

In Figs. 3 and 4 I have shown rings $b$ to be engaged in the manner described by the rods $a$. The horizontal rows of these rings overlap one another vertically and are so arranged that the rings of any one horizontal row are staggered with the rings of the adjoining horizontal rows. Thus every one rod $a$ (excepting the upper and lower rods) passes through two rows of rings, and each ring is engaged by two of the rods. The ends of the rods $a$ are directly connected by links $h$ to give compactness to the structure.

In Figs. 3ª and 4ª the rings $b$ are replaced by staggered disks $b'$, made preferably of hardened steel and provided at or near their periphery with the diametrically-placed perforations $y$, adapted for the reception of the rods $a$.

The shutter formed in the manner described is adapted to be wound upon a drum A, which has a detent and may be revolved by a crank-handle A' or in other manner.

With shutters or curtains of large dimension I employ tubes $d$, Figs. 5 and 6, which are slipped upon rods $a$, arranged in pairs in such a manner that the tubes do not break line, but are placed vertically beneath one another. Between the tubes are interposed the disks $h'$, which are staggered in the manner previously described in relation to the disks $b'$ and which serve to connect the rods $a$. The ends of the rods $a$ may be guided in grooves, if desired.

Each of the tubes $d$ is independently revoluble and consequently does not offer a fixed point of attack for burglars, especially if made of hardened material.

Of course the dimensions of my improved shutter or curtain may be varied, and the construction of the winding mechanism should be adapted to the particular size and weight of the shutter.

What I claim is—

A shutter composed of rows of overlapping disks having an upper and lower perforation and of a series of parallel connecting-rods that engage alternately the upper and lower perforation of adjoining rows of disks, substantially as specified.

In testimony whereof I have signed my name to this specification in the presence of two subscribing witnesses.

AUGUST EDMUND SCHMIDT.

Witnesses:
MAX MATTHÄI,
RUDOLPH FRICKE.